UNITED STATES PATENT OFFICE.

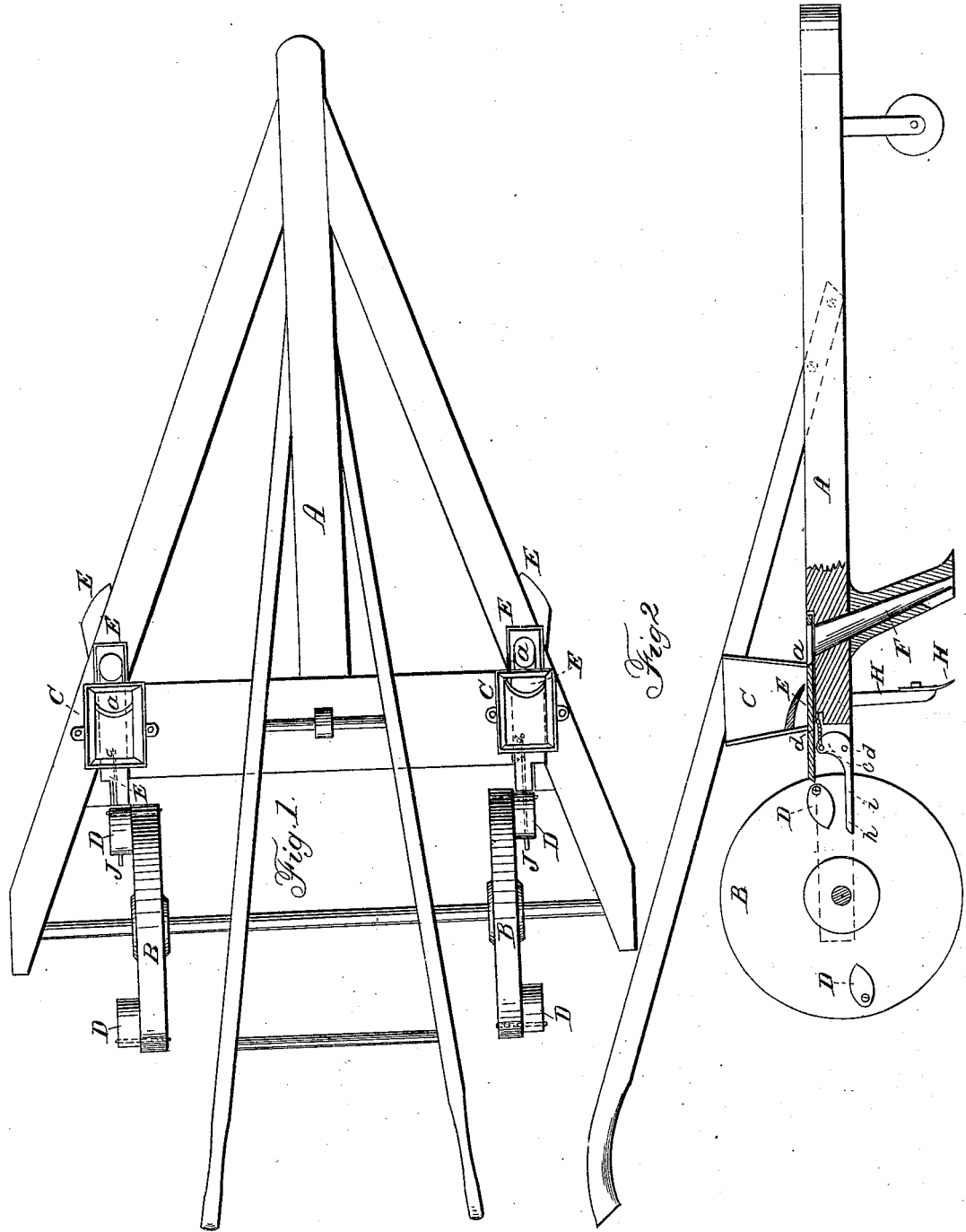

R. C. WRENN, OF MOUNT GILEAD, OHIO.

IMPROVEMENT IN SEED-PLANTERS.

Specification forming part of Letters Patent No. 10,278, dated November 29, 1853.

*To all whom it may concern:*

Be it known that I, R. C. WRENN, of Mount Gilead, in the county of Morrow and State of Ohio, have invented a certain new and useful Improvement in Self-Regulating Corn and Seed Planters; and I do hereby declare that the following is a description of the same, reference being had to the accompanying drawings, forming part of this specification, in which—

Figure 1 is a plan or bird's-eye view of the planter, the slide or seed-conveyer and the discharge-regulator being shown in dotted lines. Fig. 2 is a vertical longitudinal section through one of the hoppers, slides, drill-tooth, and part of the frame, the discharge-regulator or seed-slide operator being shown clearly, and also the cams on the wheels for operating upon it. This section is taken through the line $x\,x$.

Similar letters of reference in each of the two figures indicate corresponding parts.

The nature of my invention consists in the employment, in the manner herein described, of the elbow-slide shifters attached to the bottom of the slides in combination with one or more cams arranged fast on the outer faces and near the periphery of the propelling-wheels, whereby the slides can be moved inward and outward and made to perform their functions at every quarter, half, or whole revolution of the wheels, as may be desired.

By this very simple and utile arrangement the necessity of employing shifting-levers and other complicated mechanism to be operated by hand is dispensed with.

To enable others to understand more fully my improvements, I will describe their construction and arrangement and operation more fully.

A represents the frame of the planter, which may be constructed after the plan shown in the drawings or in any other suitable manner.

B B are the propelling-wheels, arranged behind the hoppers C C.

D D are the cams, secured on the outer face near the periphery of the wheels B, as shown in Figs. 1 and 2. There may be any number of them from one to four and upward, they serving to regulate the distances apart to plant the seed, but their principal use being to operate upon the horizontal slides E E and force them to the position shown in Figs. 1 and 2, and effect the discharge of the grain through the drill-tooth F, and then draw them back to their position again, ready for another supply. The slides E E are arranged underneath the hopper in the ordinary manner, and have holes $a$ through their bottom for the grain to fall into and escape through into the discharge-spout or drill-tooth. The drills F F serve to cut up the soil, and those H H serve to hill or cover up the corn after being deposited into the ground. The operation of the cams upon the slides E E in forcing them over the discharge-spout will be clearly seen in Fig. 2.

I J are the elbow-shifters turning on the horizontal fulcrums $b\,b$, and having their short arms $e\,f$ connected to the slides by the flexible links $d\,g$, which are attached to the under side of the bottom of the slides E E, as shown in Fig. 1, the long arms $h\,h$ being set in such a position, as seen in said figure, that when the cam escapes by the slides having forced them home they will come in contact with said arms and force them downward sufficiently far to cause the short arms to draw the slides out again to their original position. The relation which these long arms of the shifters bear to the cams will be clearly seen by reference to the drawings; also the manner in which the cams will of necessity be obliged to operate upon them as the wheels revolve, one cam serving to force one slide home and then instantaneously after draw it back again, ready for another operation.

What I claim as my invention, and desire to secure by Letters Patent, is—

The combination of the slides E, cams D, and elbow levers or shifters I J, arranged and operating in the manner herein described, and for the purpose set forth.

R. C. WRENN.

Witnesses:
MATTHEW ROBEN,
GEO. S. BRUCE.